Oct. 21, 1958  G. C. ALMASI  2,857,019
APPARATUS FOR LUBRICATING BLOOMING MILLS
Filed Feb. 8, 1954  2 Sheets-Sheet 2
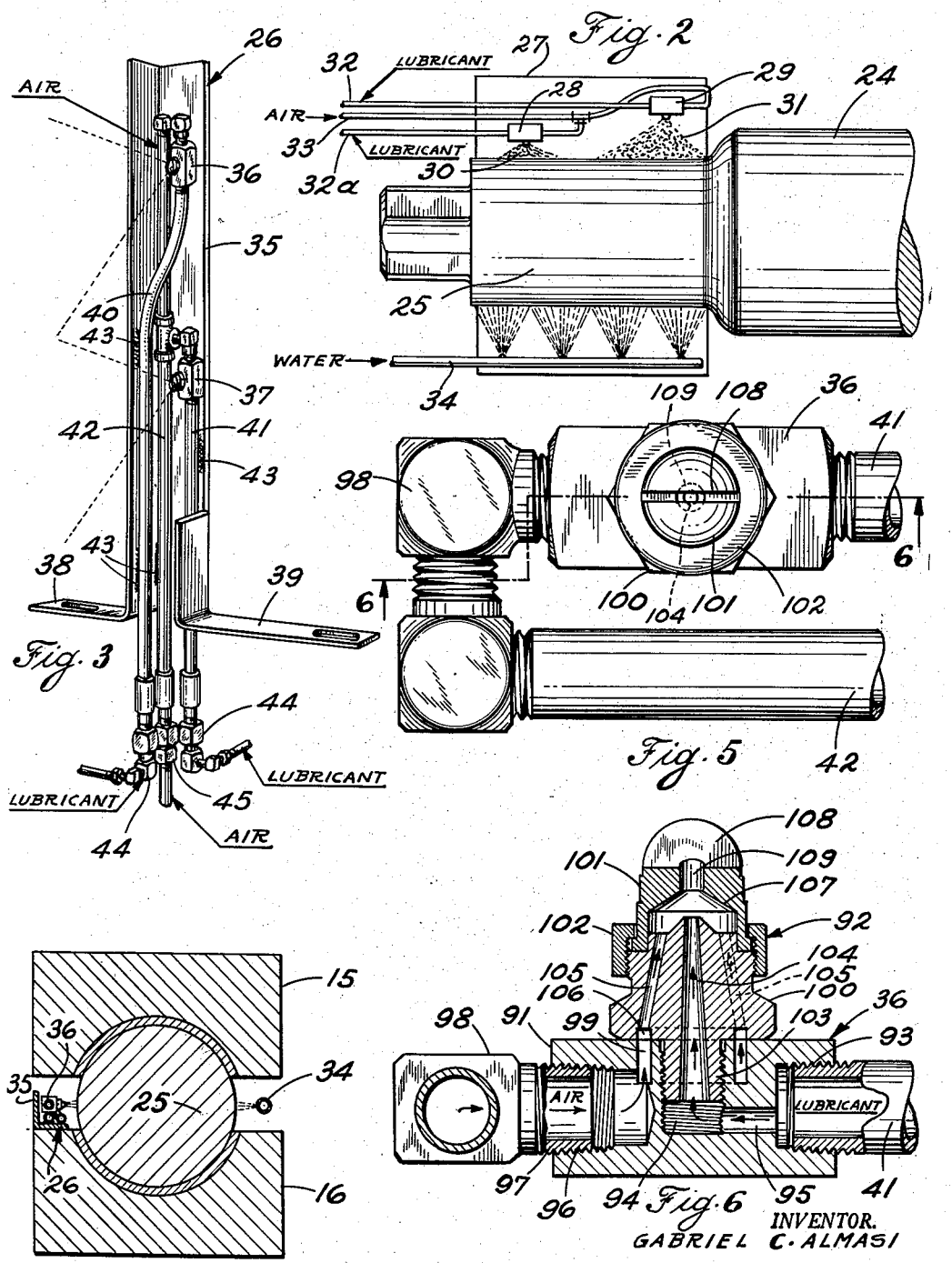
INVENTOR.
GABRIEL C. ALMASI
BY
RICHEY, WATTS, EDGERTON & McNENNY
ATTORNEYS United States Patent Office 2,857,019
Patented Oct. 21, 1958

2,857,019

APPARATUS FOR LUBRICATING BLOOMING MILLS

Gabriel C. Almasi, Boardman, Ohio, assignor to Trabon Engineering Corporation, Cleveland, Ohio, a corporation of Ohio Application February 8, 1954, Serial No. 408,853

3 Claims. (Cl. 184—7)

This invention relates to apparatus for lubricating roll bearings in blooming mills and, more generally, to apparatus for lubricating bearings in which very high load pressures are exerted upon a bearing member by a rotating member.

An object of the invention is to provide improved facilities for lubricating the roll bearings of blooming mills.

Another object of the invention is to increase the load capacity of blooming mills by improving the lubrication of the roll bearings and thereby reducing the wear produced upon the bearing portion of the roll and upon the bearing proper.

Still another object of the invention is to reduce the amount of shut-down and maintenance normally required in the operation of a blooming mill and to reduce the expenditures incident to reconditioning the rolls and roll bearings.

In the art of manufacturing steel, the steel ingot is rolled into a billet by passing the ingot through a blooming mill after the ingot has been heated in a soaking pit. The ingot is passed back and forth between two blooming rolls which exert a sufficient pressure upon the ingot to effect a substantial reduction in the size of the ingot upon each pass of the ingot through the mill.

The ends of the blooming mill are of relatively smaller diameter than the body of the roll and constitute a bearing portion of the roll or, to adopt the terminology commonly employed in the art, the roll neck. The roll necks are supported in bearings or chucks which move up and down in a housing to accommodate the movement of the ingot. The roll necks and bearings must withstand very great pressures and are usually cooled by means of a water spray to obviate the effects of the high temperature of the ingot as it comes from the soaking pit and the further heat generated during the rolling process. Lubrication has heretofore been accomplished either manually by applying block grease to the roll neck, or mechanically, by feeding grease through openings formed in the bearing chucks to grooves cut along the bearing surface of the chuck. With such arrangements, the opposed bearing surfaces of the roll neck and the chuck cannot effectively utilize the large amounts of grease supplied, and the roll necks soon become scored and grooved, thereby making it necessary to shut down the mill to resurface the roll necks. In particular, this mode of lubrication has resulted in a bearing life which is less than the normal wearing life of the surfaces of the rolls.

This invention comprises an arrangement for lubricating the roll necks of a blooming mill in a manner such that a very substantial increase in the roll bearing life is obtained, e. g. by a factor of three to four times, and which greatly reduces the quantity of lubricant required during the operation of the mill.

The lubricant is applied directly to the surface of the roll neck by spraying the lubricant upon the surface using compressed air as a carrier. The lubricant is applied to the surface of the roll neck as the roll neck turns free of the chuck in the chuck gap so that a layer of tightly adhering lubricant is formed on the surface of the neck while it is out of contact with the chuck. The lubricant is applied by means of ejectors which are supplied with lubricant by multiple outlet, cyclically operable feeders which are mounted at the head of the blooming mill housing. The ejectors are continuously supplied with compressed air from a compressor so that a continuous spray of lubricant is formed by the ejector and applied to the surface of the roll neck as it turns free of the chuck. The feeders are operatively actuated and supplied with lubricant at a sufficiently high pressure from a lubricant pump and a distributor. The pump is controlled by a timer and operates only during predetermined intervals. During the intervals when the pump is not operating, the lubricant pressure is maintained by the elastic expansion of lubricant in a relatively long pipe which extends between the pump and the distributor. The pipe functions as an accumulator and permits the use of a pump of any arbitrary capacity by merely adjusting the interval during which the pump is operative.

It is an exceedingly important feature of the invention that, by reason of the manner of continuously applying the grease to the roll neck and intermittently operating the lubricant pump, substantial economies are effected particularly as to the quantity of lubricant used in the operation of the mill.

The invention together with further objects, features and advantages thereof will be more readily understood from a consideration of the following detailed description and claims taken in connection with the accompanying drawings, in which:

Fig. 2 is a schematic representation, illustrating the principle of the invention;

Fig. 3 is a perspective view showing the lubricating device used for applying the lubricant to the roll neck in the practice of the invention;

Fig. 4 is a schematic diagram showing the manner in which the lubricating device is mounted in the roll chucks;

Fig. 5 is a plan view of an ejector; and

Fig. 6 is a sectional view taken along the lines 6—6 in Fig. 5 and showing the internal construction of the ejector.

Figure 1:
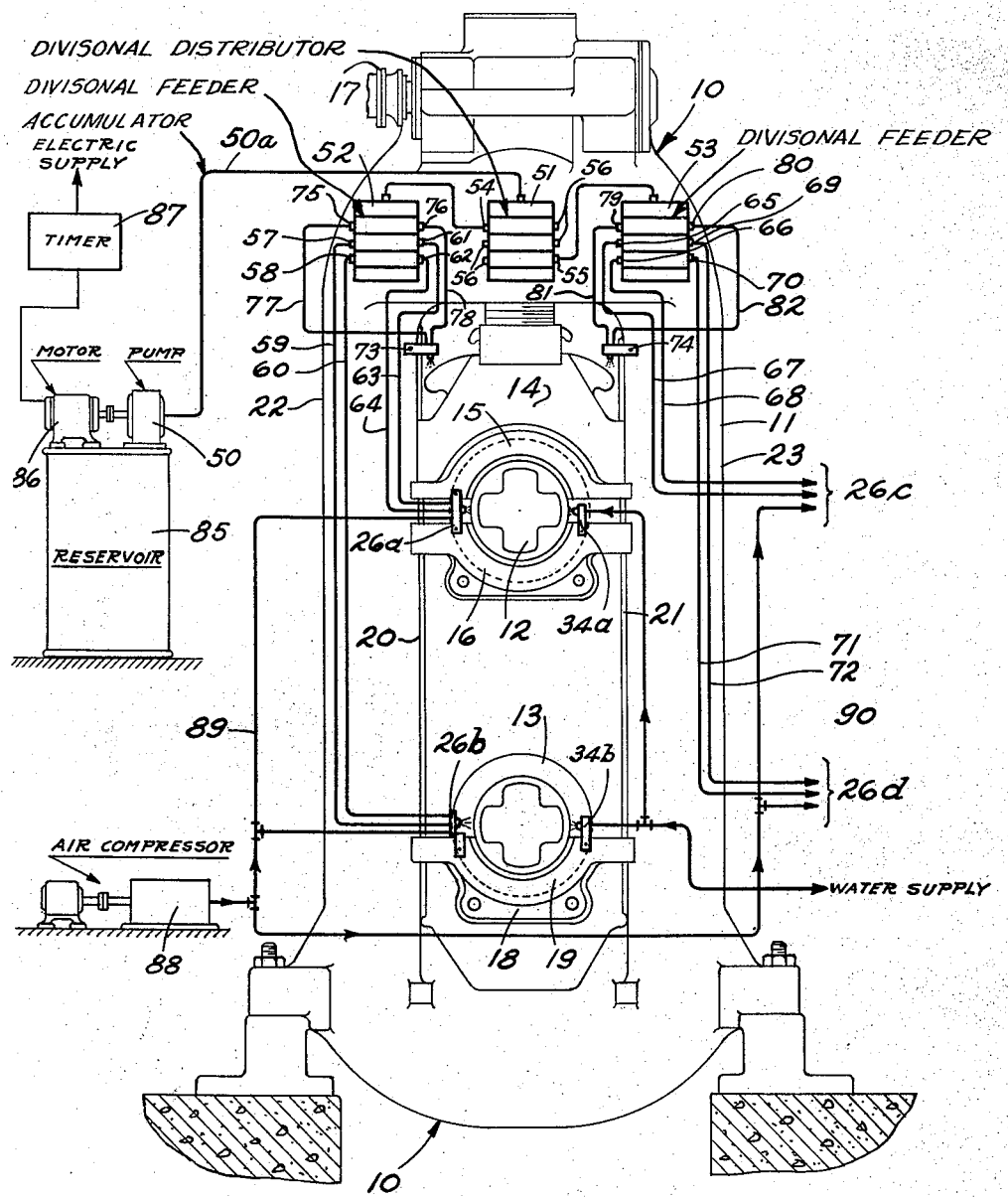
Fig. 1 is a elevation view of a blooming mill incorporating the lubricating apparatus of the invention.

Referring now to Fig. 1, the lubricating apparatus of the invention is shown in connection with a blooming mill 10 comprising a housing 11 and having an upper blooming roll 12 and a lower blooming roll 13.

The upper blooming roll 12 is supported in an upper carrier 14 having an upper chuck 15 and a lower chuck 16 which form a bearing for the roll 12. The upper carrier 14 is operatively actuated by a drive 17 and other mechanism for raising and lowering the carrier 14 to position the roll 12 at a predetermined distance from the roll 13 for each pass of the ingot through the mill.

The lower roll 13 is supported by a lower carrier 18 which includes a chuck 19. The lower carrier 18 is adjustably positioned in the housing 11 by means well known in the art and not shown herein.

The upper and lower carriers 15 and 18, respectively, are constrained by two bearing plates 20 and 21 which are supported by the side pillars 22 and 23 of the housing 11.

Referring now to Fig. 2, each of the blooming rolls 12 and 13 comprises a body portion 24 which engages the steel ingot and a reduced portion or neck 25 at each end of the roll. The neck 25 constitutes the bearing portion of the roll and cooperates with the chucks 15 and 16 or the chuck 19 as the case may be.

In accordance with the invention, the several bearings of the mill are lubricated by a plurality of lubricating devices 26 which are mounted upon the carrier chucks and spray a lubricant upon the roll neck 25 as it turns in the chuck. The lubricant is sprayed upon the roll neck by means of compressed air, and the lubricant is carried upon the surface of the neck into the area of engagement of the roll neck with the chuck so that an adequate layer or film of lubricant is maintained between the engaging portions of the lower neck and chuck.

In Fig. 2, the roll neck 25 is carried in the chuck 27, while two ejectors 28 and 29 produce fan-shaped sprays 30 and 31 which are directed upon the exposed portion of the roll neck. Separate lubricant pipes 32 and 32a are connected to the ejectors 28 and 29 for supplying lubricant to the ejectors, while a pipe 33 is connected to both ejectors and supplies the necessary compressed air for operating the ejectors and producing the sprays 30 and 31.

As also shown in Fig. 2, the roll neck 25 is cooled by a device 34 which sprays water upon the exposed portion of the roll neck. Such means of cooling the roll neck are old and well known in the art and are necessary because of the high temperature of the ingot and because of the intense heat generated during the blooming operation. However, reference to the device is important inasmuch as the invention has certain significant features and advantages which derive their importance from the necessity of such cooling. More particularly, the force of application of the lubricant tends to disperse any water or film of water on the roll neck and, conversely, the coat of lubricant formed upon the surface of the neck adheres so tightly that it is not affected by the water spray which strikes the roll neck after the lubricant is applied.

Referring now to Fig. 3, the lubricating device of the invention comprises a support member 35 which carries two ejectors 36 and 37 spaced along the length thereof. The support member 35 may be formed of ordinary angle iron and has projecting portions 38 and 39 for securing the device to the roll chuck. Separate lubricant pipes 40 and 41 are connected to the lubricant inlets of the respective ejectors, while a common air pipe 42 is connected to the compressed air inlets thereof. The pipes 41 and 42 may be welded to the support member 35, as designated at 42, while the pipes are fitted at the outer ends thereof by suitable couplings 44 and 45.

Fig. 4 is a schematic representation showing particularly the manner in which the lubricating devices 26 are mounted between the chucks 15 and 16. The support members 35 rest upon the lower chuck 16, while the ejectors 36 are directed toward the exposed surface of the roll neck 25. As shown in Fig. 4, the nozzle of the ejector may be aligned with the center of the roll, although such an arrangement is not essential to the practice of the invention.

Referring again to Fig. 1, the lubricating devices 26 are supplied with lubricant from a pump 50 by means of an arrangement which includes a distributor 51 and two feeders 52 and 53. The distributor 51 and the feeders 52 and 53 are lubricant operated, single inlet, multiple outlet, cyclically operable valve mechanisms commonly known in the art as divisional feeders. Feeders of the type used in practicing the present invention are described, for example, in application Serial No. 220,609, filed April 12, 1951, by Robert L. Harter and entitled "Divisional Feeder," now Patent No. 2,718,281, issued on September 20, 1955. The capabilities of such feeders constitutes an important aspect of the invention insofar as the novel results are concerned, although it is not intended to limit the invention to the use of such feeders in particular.

The distributor 51 has the inlet thereof connected to the outlet of the pump 50 by means of a pipe 50a which should be of sufficient length to act as an accumulator, that is, to store an adequate amount of lubricant within the range of compressibility which may be affected by the pump 50 in working against distributor 51. The pump 50 normally pumps lubricant into the pipe 50a at a greater rate than the distributor 51 distributes lubricant to the feeders 52 and 53 as hereinafter described. When pipe 50a is 100 feet long and pump 50 is pumping at a normal operating pressure of 1000 to 2000 pounds and the lubricant is compressible to the extent of about .4% to .6% per 1000 pounds applied pressure, the extent of compression of the lubricant in the pipe may be equivalent to between about 1½ and 4½ cubic inches. When the discharging rate of the distributor is about .8 cubic inch per minute, the distributor will be supplied with lubricant due to such compression for from about 2 to 5 minutes after the pump has stopped. Thus the pump may be stopped for an interval of several minutes after it has built up a predetermined amount of compression in the pipe 50a and yet during that interval lubricant will be continuously supplied to the distributor 51.

The distributor 51 has one outlet 54 thereof connected to the inlet of the feeder 52 and a second outlet 55 connected to the feeder 53. The remaining outlets 56 are interconnected with the outlets 54 and 55 to permit cyclical operation of the valves of the distributor when distributing only to the feeders 52 and 53 as set forth in the applications referred to above. The feeder 52 supplies lubricant to the bearings at one end of the mill, while the feeder 53 supplies lubricant to the bearings of the remaining end of the mill.

As shown herein, the feeder 52 has the outlets 57 and 58 at one side of the feeder connected by means of pipes 59 and 60 to the ejectors of the lubricating device 26b of the lower roll carrier, while the associated outlets 61 and 62, at the remaining side of the feeder, are connected by means of pipes 63 and 64 to the ejectors of the lubricating device 26a of the upper roll carrier 15.

Similarly, the outlets 65 and 66 are connected to the ejectors of lubricating device 26c at the remaining end of the mill by means of pipes 67 and 68, and the associated outlets 69 and 70 are connected to the ejectors of the associated lubricating device 26d by means of pipes 71 and 72. The pipes 59 and 60, 63 and 64, 67 and 68, and 71 and 72 are all of a sufficient length such that, during the intervals between the times when lubricant is ejected from any given outlet into its associated pipe, sufficient lubricant is stored or accumulated in the pipes to supply the ejector until the feeder again ejects lubricant into that conduit. This accumulation occurs when the feeder discharges lubricant into any of these pipes at a greater rate than it can flow through the ejectors and hence compresses the lubricant in the pipe to some extent. During the time when the feeder is ejecting lubricant into the pipe, the lubricant is forced through the pipe to the ejector. During the intervening periods, the lubricant is fed to the ejector under the influences of compression and gravity and is also drawn to the ejector by reason of the suction effect produced by the compressed air in the ejector. It will be understood that the pumping times are so selected that all the pipe lines, distributor, feeders and ejectors will be full of lubricant at all times.

The feeders 52 and 53 also supply lubricant to the lubricators 73 and 74 which apply the lubricant to the bearing surfaces of the bearing plates 20 and 21. The lubricator 73 is connected to the outlets 75 and 76 by means of conduits 77 and 78, while the lubricator 74 is connected to outlets 79 and 80 of feeder 53 by conduits 81 and 82. By reason of the cyclical operation of the feeders, each of the bearings associated with a given feeder is supplied with lubricant in turn. Thus, the lubricator 73 and the lubricating devices 26a and 26b are supplied with lubricant from outlets 75, 57 and 58 in that order, and then from outlets 76, 61 and 62, in that order.

The pump 50 draws lubricant from a reservoir 85 which may, in practice, constitute the container in which the lubricant is supplied, the pump 50 then being termed a "barrel pump." The pump 50 is driven by a motor 86 which is connected to a power supply through a timer 87. The timer 87 constitutes an automatic control and energizes the motor so as to drive the pump and supply lubricant to the pipe 54 during a first predetermined interval. The motor is then deenergized during a succeeding interval and the distributor 51 is supplied with lubricant by reason of the elastic expansion of the lubricant held by the pipe 50a. The timer 87 may be any of a number of devices well known in the art, it being necessary only that the timer function to automatically turn the motor 86 on and off at recurrent predetermined intervals.

The lubricating devices 26 are supplied with compressed air from a compressor 88. The outlet of the compressor is connected to the air inlets of the several ejectors by means of suitable pipes 89 and 90. The two ejectors of each lubricating device are supplied with air through a common line and sufficient pressure must be maintained in the air line to produce the required spray intensity at the surface of the roll. The actual pressure to be employed will, of course, vary greatly with the nature of the lubricant and the capacity of the ejectors.

Referring now to Figs. 5 and 6, the ejector 36 of the lubricating device 26 illustrated in Fig. 2 is there shown in detail. The remaining ejectors are, of course, similar in design to the ejector 36.

The ejector 36 comprises a body 91 for receiving the lubricant and compressed air from the pipes 41 and 42 and a nozzle 92 for mixing the lubricant and air and forming a suitable spray. The body 91 has a threaded opening 93 at one end thereof for receiving the lubricant pipe 41 and constitutes the lubricant inlet of the ejector. The opening 93 communicates with a threaded central opening 94 into which the nozzle 92 is received by means of a passage 95. A second threaded opening 96 at the remaining end of the body comprises the compressed air inlet of the ejector and receives the threaded portion of a right angle fitting 98 which comprises a part of the compressed air line 42. The air inlet opening 96 communicates with an annular passage 99 which is coaxial with the opening 94 and serves to distribute compressed air about the periphery of the nozzle 92.

The nozzle 92 comprises a lower or body portion 100 having a tip 101 and a clamp 102 for securing the nozzle tip to the nozzle body. The nozzle body 100 has a threaded lower projecting portion 103 which is received in the nozzle opening 94 of the ejector body 91. An opening 104 axially through the body serves to transmit lubricant from the pipe 41 to the interior of the nozzle tip 101. A plurality of longitudinally directed, generally converging openings 105 are spaced about the periphery of the opening 104 and communicate at the lower end of the nozzle body with an annular groove 106 which is aligned with the annular opening 99 in the ejector body.

The nozzle tip 101 has an opening 107 which comprises a mixing chamber for the air and lubricant, a slot 108 at the upper end of the tip, and an axial opening 109 extending from the opening 107 to communicate with the slot 108.

In operation, the compressed air is transmitted from the pipe 42 through the opening 96, into the annular openings 99 and 106 and thence to the longitudinal openings 105 to the tip 101. The air passes through the opening 109 and, by reason of the suction created in the opening 104, or by reason of the pressure of lubricant in the pipe 41, lubricant passes from the pipe 41 through the openings 93, 95, 94 and 104 to the tip 101. The lubricant and air are mixed in the chamber 107 and forced through the opening 109 to be formed into a flat spray by the slot 108.

The construction of the nozzle 92 is important in that it is necessary that the opening 107 be larger than is usual in ordinary ejectors and preferable that the opening 109 extend beyond the inner extremity of the slot 108. Ordinary ejectors, not so formed, will tend to jam and clog and are, in general, unreliable.

By way of example and without any intention of limiting the invention thereto, the invention was successfully practiced under the following conditions:

Accumulator (pipe 50a): ¾ inch diameter pipe—100 feet long;
Feeder lines: ¼ inch diameter pipe—15 to 20 feet long;
Pump: 11 cubic inches per minute;
Timer: On, 50 seconds; off, 2 minutes, 20 seconds;
Operating pressure: 1,000 to 2,000 p. s. i.; and
Lubricant consumption: 900 to 1,000 pounds per unit period.

The lubricant used was a special grade of lubricant which, while relatively heavy, incorporated no body material. This constitutes one advantage of the invention, e. g. that such lubricant may be used. With the lubricating arrangements heretofore utilized, it was necessary to use heavy grease which incorporated relatively large amounts of nonlubricating material for purposes of giving body to the actual lubricant.

As a result of the practice of the invention set forth above, the following results were achieved:

(1) Lubricant consumption was reduced by over 50%;
(2) The life of the bearings of the blooming mill was at least tripled;
(3) The need for dressing the roll necks after short periods of operation was completely eliminated; and
(4) The amount of time required for general maintenance and installation of the lubricating apparatus was greatly reduced.

It is to be understood that the specific nature of the present disclosure is not intended to be restrictive or confining, but that various rearrangements of the apparatus may be resorted to, giving effect to a reasonable breadth of construction of the express language of the claims, as hereinafter set forth.

What is claimed is:

1. Apparatus for lubricating the bearing of a roll neck in a blooming mill which comprises a plurality of ejectors having mixing chambers and positioned along a roll neck, a compressor, a pipe open at all times to the compressor and to the ejectors for continuously supplying compressed air to the mixing chambers of all the ejectors, a lubricant reservoir, a pump having its inlet connected to the reservoir, an accumulator having its inlet connected to the outlet of the pump, a distributor having its inlet connected to the outlet of the accumulator, a single inlet, plural outlet, cyclically operable feeder having its inlet connected to an outlet of the distributor and having outlets successively connectible to the mixing chambers of each of several ejectors for supplying lubricant to the latter in rapid succession and at relatively high pressure, and a timer connected to the drive motor of the pump for operating the pump during a first predetermined interval and then stopping the pump during a succeeding predetermined interval, the continuous flow of compressed air through the ejectors and the rapid, successive delivery of lubricant to the ejectors producing a substantially continuous spray of lubricant from each ejector onto the roll neck during both of said intervals.

2. Apparatus for lubricating the bearings of roll necks in a blooming mill which comprises a plurality of ejectors having mixing chambers and positioned along the necks at each end of each roll, a compressor, a pipe open at all times to the compressor and to the ejectors for continuously supplying compressed air to the mixing chambers of all the ejectors, a lubricant reservoir, a pump having its inlet connected to the reservoir, an accumulator having its inlet connected to the outlet of the pump, a distributor having its inlet connected to the outlet of the accumulator and having two alternately opened and closed outlets, single inlet, plural outlet, cyclically operable feeders, each having its inlet connected to an outlet of the distributor and having outlets successively connectible to the mixing chambers of each of the several ejectors at an end of the rolls, said distributor and feeders serving to supply lubricant in rapid succession and at relatively high pressures to the ejectors at each of the necks, and a timer connected to the drive motor of the pump for operating the pump during a first predetermined interval and then stopping the pump during a succeeding predetermined interval, the continuous flow of compressed air through the ejectors and the rapid successive delivery of lubricant to the ejectors producing a substantially continuous spray of lubricant on the roll necks.

3. Apparatus for lubricating the roll bearing of a blooming mill in which a chuck carries a roll neck comprising a plurality of ejectors positioned along the depth of the chuck for spraying lubricant upon the roll neck as it turns in the chuck and each ejector having a mixing chamber, a compressor, a pipe open at all times to the compressor and to all the ejectors for continuously supplying compressed air to the mixing chambers of all the ejectors, a lubricant reservoir, a pump connected to the reservoir, an accumulator connected to the pump, distributor means connected to the accumulator and a cyclically operable divisional feeder having a single inlet connected to said distributor means and having a plurality of outlets connected respectively to said ejectors, said outlets being connected one at a time in succession with their respective ejectors for discharge of lubricant thereinto.

References Cited in the file of this patent

UNITED STATES PATENTS

| | | |
|---|---|---|
| 524,318 | Gill | Aug. 14, 1894 |
| 772,016 | Woodford | Oct. 11, 1904 |
| 1,811,343 | Bancroft | June 23, 1931 |
| 1,852,579 | Johnson | Apr. 5, 1932 |
| 1,899,472 | Miller | Feb. 28, 1933 |
| 2,007,797 | Folke | July 9, 1935 |
| 2,551,660 | Feilden | May 8, 1951 |
| 2,667,236 | Graves | Jan. 26, 1954 |

FOREIGN PATENTS

| | | |
|---|---|---|
| 185,972 | Great Britain | Sept. 21, 1922 |